Oct. 18, 1932.　　F. O. FERNSTRUM　　1,883,661
MARINE MOTOR
Filed Jan. 23, 1932　　2 Sheets-Sheet 1
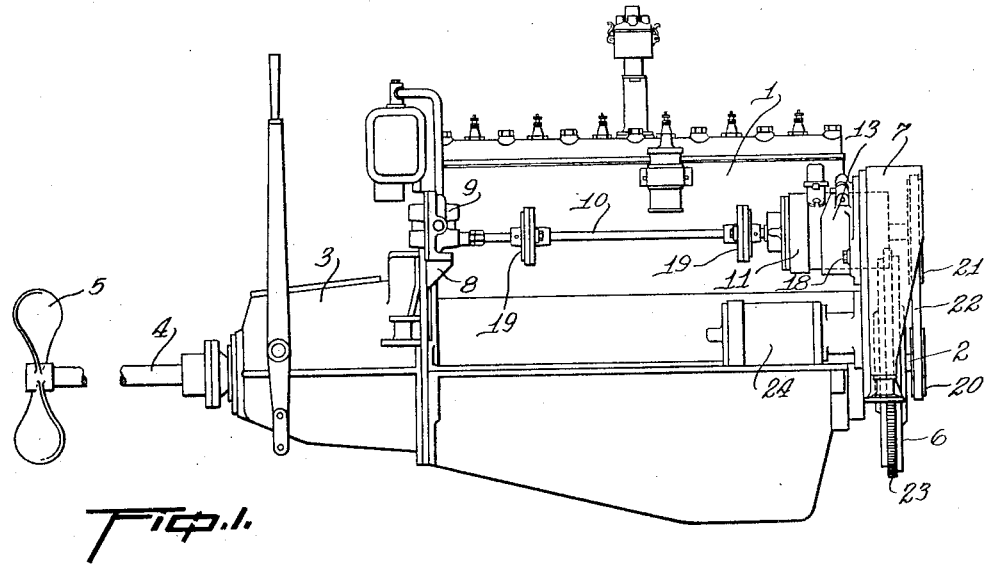
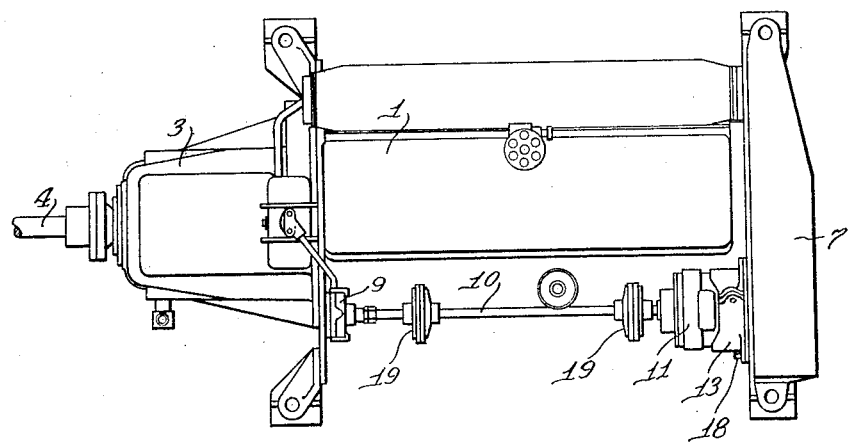
INVENTOR
*Frank O. Fernstrum*
BY
ATTORNEYS Oct. 18, 1932.  F. O. FERNSTRUM  1,883,661
MARINE MOTOR
Filed Jan. 23, 1932  2 Sheets-Sheet 2
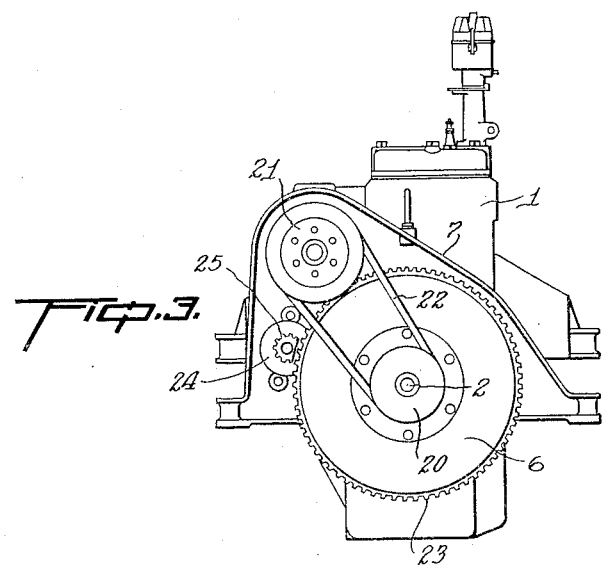
Fig. 3.
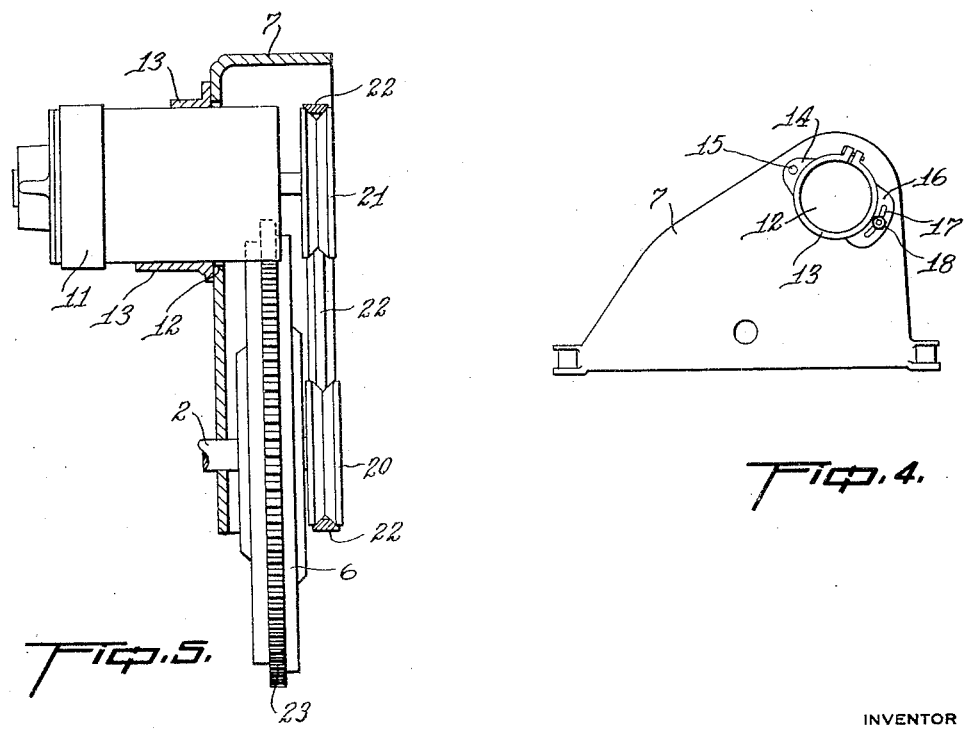
Fig. 4.
Fig. 5.
INVENTOR
*Frank O. Fernstrum*
BY 
ATTORNEYS Patented Oct. 18, 1932

1,883,661

UNITED STATES PATENT OFFICE

FRANK O. FERNSTRUM, OF DETROIT, MICHIGAN, ASSIGNOR TO GRAY MARINE MOTORS CO., OF DETROIT, MICHIGAN, A CORPORATION OF MICHIGAN

MARINE MOTOR

Application filed January 23, 1932. Serial No. 588,314.

The present invention pertains to a novel marine motor of the internal combustion type, and the principal object is to obtain certain desirable operating characteristics by the use of a V-belt for driving the accessory or jack shaft from the crank shaft.

While the conventional automotive engine has its flywheel near the rear end and its accessory shaft drive at the forward end, the present invention provides for the mounting of both these parts at the forward end of the motor. In other words, the V-belt drive is accommodated to the usual forward mounting of the flywheel in marine practice. Moreover, particular ease in changing the V-belt is enabled by mounting the belt at the forward face of the flywheel so that a new belt need not be positioned behind a rotating member as is now the case in automotive practice. The usual use of the flywheel for starting purposes by gearing it to an electric starter is present in the present invention despite the unconventional mounting and relation of the flywheel and accessory shaft drive.

The belted end of the accessory shaft is made adjustable by the provision of one or more universal joints in the shaft, so that this end may be adjusted for tightening the V-belt when necessary. The provision of a V-belt affords a wide range of speed ratio between the crank shaft and accessory shaft and further assures quietness, flexibility and protection of the accessories from shock.

The invention is fully disclosed by way of example in the following description and in the accompanying drawings, in which—

Figure 1 is a side elevation of a marine motor according to the invention;

Fig. 2 is a plan view thereof;

Fig. 3 is an end view;

Fig. 4 is a detail elevation of the hood for the flywheel and V-belt; and

Fig. 5 is a detail longitudinal section of the hood, showing the associated parts in elevation.

Reference to these views will now be made by use of like characters which are employed to designate corresponding parts throughout.

In Figure 1 is illustrated a gasoline motor comprising a block 1 and having a crank shaft 2 journalled therein in the usual manner. A transmission mechanism 3 is provided at one end of the motor block, which in this case is the stern end, as illustrated by the propeller shaft 4 extending therefrom and carrying a propeller shaft 5. A flywheel 6 is mounted on the crank shaft at the forward end of the block and exteriorly thereof, as distinguished from the usual automotive practice in which the flywheel is mounted between the block and the transmission.

A hood 7 is secured to the forward end of the motor block directly over the flywheel for a purpose which will presently appear. At the forward end of the motor block is a bracket 8 which supports a conventional pump 9, and from the pump extends a shaft 10 towards the hood 7. This shaft is known as the jack shaft or accessory shaft for driving certain accessories of the motor such as the water pump and the generator. The generator 11 is mounted on the forward end of the shaft and passes through an oversized opening 12 in the hood 7. A clamping ring 13 surrounds the generator at the hood and has a lug 14 pivoted as at 15 to the hood. Diametrically opposite the lug 14 is another lug 16 with a concentric slot 17 receiving an adjustable bolt 18 extending from the hood. The shaft 10 has two universal joints 19 inserted therein, and these joints permit adjustment of the generator in the opening 12 as the ring 13 is swung on its pivot 15 and locked in any given position by the bolt 18.

The forward end of the crank shaft 2 carries a pulley 20 at the flywheel 6 and preferably at the forward face thereof. In like manner, the accessory shaft 10 carries a pulley 21 in vertical alinement with the pulley 20 and connected thereto by a V-belt 22 passing over both pulleys. It will now be apparent that, in order to tighten the belt 22, it is merely necessary to adjust the generator 11 and hence the forward end of the accessory shaft in the hood 7 in the manner already described. It will also be seen that the forward face of the hood is open, as shown more clearly in Figures 3 and 5, permitting easy access to the belt. By positioning the belt entirely forward of the flywheel, there are no parts interfering with the direct mounting of a new belt on the pulleys, and no parts need be dismantled as is now the case in automotive practice. The pulleys 20 and 21 may be furnished in various sizes, thereby enabling a wide range of speed ratio between the crank shaft and the accessory shaft.

Notwithstanding the unique position of the flywheel and its relation to the accessory shaft drive, the flywheel is still used for starting purposes. Accordingly, gear teeth 23 are formed on the periphery of the flywheel, and an electric starter 24 is secured to the motor block and has a pinion 25 meshing with the gear teeth 23.

Apart from the advantages of the V-belt already mentioned, this construction is quiet and flexible in operation, and maintains the accessories free from shocks originating in the crank shaft. Moreover, the provision of a V-belt drive on marine engines has been found to decrease the weight and length with relation to the output rating so that it results in increased horsepower per pound of weight, per inch of length and per cubic inch of displacement.

Although a specific embodiment of the invention has been illustrated and described, it will be understood that various alterations in the details of construction may be made without departing from the scope of the invention, as indicated by the appended claims.

What I claim is:—

1. In a marine motor, a block, a crank shaft journalled in said block, transmission mechanism at the stern end of said block, a flywheel on said crank shaft at the forward end of said block and external thereof, an accessory shaft journalled adjacent said block, and a V-belt connecting said crank shaft to said accessory shaft at said flywheel.

2. In a marine motor, a block, a crank shaft journalled in said block, transmission mechanism at the stern end of said block, a flywheel on said crank shaft at the forward end of said block and external thereof, an accessory shaft journalled adjacent said block, and a V-belt connecting said crank shaft to said accessory shaft at the forward face of said flywheel.

3. In a marine motor, a block, a crank shaft journalled in said block, transmission mechanism at the stern end of said block, a flywheel on said crank shaft at the forward end of said block and external thereof, an accessory shaft journalled adjacent said block, a V-belt connecting said crank shaft to said accessory shaft at said flywheel, and a universal joint in said accessory shaft, whereby the belted end of said shaft is adjustable for tightening said belt.

4. In a marine motor, a block, a crank shaft journalled in said block, transmission mechanism at the stern end of said block, a flywheel on said crank shaft at the forward end of said block and external thereof, an accessory shaft journalled adjacent said block, a V-belt connecting said crank shaft to said accessory shaft at the forward face of said flywheel, and a universal joint in said accessory shaft, whereby the belted end of said shaft is adjustable for tightening said belt.

5. In a marine motor, a block, a crank shaft journalled in said block, transmission mechanism at the stern end of said block, a flywheel on said crank shaft at the forward end of said block and external thereof, an accessory shaft journalled adjacent said block, a V-belt connecting said crank shaft to said accessory shaft at the forward face of said flywheel, and a hood covering said flywheel and belt and open at its forward face to permit access to said belt.

6. In a marine motor, a block, a crank shaft journalled in said block, transmission mechanism at the stern end of said block, a flywheel on said crank shaft at the forward end of said block and external thereof, an accessory shaft journalled adjacent said block, a V-belt connecting said crank shaft to said accessory shaft at the forward face of said flywheel, and a hood covering said flywheel and belt and open at its forward face to permit access to said belt, said accessory shaft having an adjustable bearing in said hood for tightening said belt.

7. In a marine motor, a block, a crank shaft journalled in said block, transmission mechanism at the stern end of said block, a flywheel on said crank shaft at the forward end of said block and external thereof, an accessory shaft journalled adjacent said block, a V-belt connecting said crank shaft to said accessory shaft at the forward face of said flywheel, and a hood covering said flywheel and belt and open at its forward face to permit access to said belt, said accessory shaft having a universal joint and an adjustable portion in said hood for tightening said belt.

8. In a marine motor, a block, a crank shaft journalled in said block, transmission mechanism at the stern end of said block, a flywheel on said crank shaft at the forward end of said block and external thereof, an accessory shaft journalled adjacent said block, a V-belt connecting said crank shaft to said accessory shaft at the forward face of said flywheel, gear teeth on the periphery of said flywheel, and an electric starter geared to said teeth.

9. In a marine motor, a block, a crank shaft journalled in said block, transmission mechanism at the stern end of said block, a flywheel on said crank shaft at the forward end of said block and external thereof, an accessory shaft journalled adjacent said block, a V-belt connecting said crank shaft to said accessory shaft at the forward face of said flywheel, a hood covering said flywheel and belt and open at its forward face to permit access to said belt, a universal joint in said accessory shaft, and a generator mounted on said shaft and adjustably attached to said hood for tightening said belt.

10. In a marine motor, a block, a crank shaft journalled in said block, transmission mechanism at the stern end of said block, a flywheel on said crank shaft at the forward end of said block and external thereof, an accessory shaft journalled adjacent said block, a V-belt connecting said crank shaft to said accessory shaft at the forward face of said flywheel, a hood covering said flywheel and belt and open at its forward face to permit access to said belt, a universal joint in said accessory shaft, a generator mounted on said shaft and adjustably attached to said hood for tightening said belt, gear teeth on the periphery of said flywheel, and an electric starter geared to said teeth.

In testimony whereof I affix my signature.

FRANK O. FERNSTRUM.